United States Patent
Uchida et al.

(10) Patent No.: US 9,670,856 B2
(45) Date of Patent: Jun. 6, 2017

(54) CONTROL APPARATUS FOR AUTOMATICALLY RESTARTING AN INTERNAL COMBUSTION ENGINE

(71) Applicants: Akito Uchida, Toyota (JP); Hiroshi Enomoto, Nisshin (JP); Yoshifumi Nakamura, Okazaki (JP)

(72) Inventors: Akito Uchida, Toyota (JP); Hiroshi Enomoto, Nisshin (JP); Yoshifumi Nakamura, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 319 days.

(21) Appl. No.: 14/386,702

(22) PCT Filed: Mar. 13, 2013

(86) PCT No.: PCT/IB2013/000369
§ 371 (c)(1),
(2) Date: Sep. 19, 2014

(87) PCT Pub. No.: WO2013/140218
PCT Pub. Date: Sep. 26, 2013

(65) Prior Publication Data
US 2015/0025779 A1    Jan. 22, 2015

(30) Foreign Application Priority Data

Mar. 23, 2012  (JP) .................................. 2012-067754

(51) Int. Cl.
*F02D 41/06* (2006.01)
*F02D 41/00* (2006.01)
(Continued)

(52) U.S. Cl.
CPC .......... *F02D 41/065* (2013.01); *F02D 29/02* (2013.01); *F02D 41/009* (2013.01); *F02D 41/30* (2013.01);
(Continued)

(58) Field of Classification Search
CPC ............. F02N 11/0814; F02N 11/0818; F02N 2200/021; F02D 41/06–41/065;
(Continued)

(56) References Cited

U.S. PATENT DOCUMENTS 7,472,016 B2 * 12/2008 Takeyama ............. F02D 41/065
123/179.4
8,301,361 B2 * 10/2012 Hashimoto ......... F02D 41/0087
123/179.16
(Continued)

FOREIGN PATENT DOCUMENTS

| JP | 2000-205026 | 7/2000 |
|---|---|---|
| JP | 2009-275635 | 11/2009 |
| JP | 2011-99357 | 5/2011 |

OTHER PUBLICATIONS

International Search Report issued Sep. 20, 2013, in PCT/IB13/00369 filed Mar. 13, 2013.

*Primary Examiner* — Erick Solis
*Assistant Examiner* — Robert Werner
(74) *Attorney, Agent, or Firm* — Oblon, McClelland, Maier & Neustadt, L.L.P.

(57) ABSTRACT

When a stop position of a piston resulting from the automatic stop is in a range that is on an advance side of a threshold in terms of crank angle, fuel injection is performed at beginning of the automatic restart-up in the cylinder that is in the intake stroke and an ignition is performed in a subsequent initial compression stroke in the same cylinder. When the stop position of the piston resulting is in a range that is on a retard side of the threshold in terms of crank
(Continued)

angle, initial fuel injection is performed in the cylinder that next enters an intake stroke among the cylinders of the internal combustion engine after the beginning of automatic restart-up and initial ignition is performed in a subsequent compression stroke in the same cylinder. The threshold is determined in accordance with an amount of deviation of a crank angle.

4 Claims, 7 Drawing Sheets

(51) Int. Cl.
    *F02N 11/08*     (2006.01)
    *F02D 29/02*     (2006.01)
    *F02D 41/30*     (2006.01)

(52) U.S. Cl.
    CPC .. *F02N 11/0814* (2013.01); *F02D 2041/0092* (2013.01); *F02D 2700/07* (2013.01); *F02N 2200/021* (2013.01); *F02N 2300/2002* (2013.01); *Y02T 10/48* (2013.01)

(58) Field of Classification Search
    CPC .... F02D 41/009; F02D 41/30; F02D 41/3076; F02D 41/0092
    USPC .......... 701/105, 112, 113; 123/179.4, 179.5, 123/406.53, 406.58, 406.61, 406.62, 491; 73/114.26, 114.27, 114.62, 114.63
    See application file for complete search history.

(56) References Cited

U.S. PATENT DOCUMENTS

| | | | |
|---|---|---|---|
| 9,133,776 B2 * | 9/2015 | Shimizu | .............. F02D 13/0238 |
| 2015/0252771 A1 * | 9/2015 | Shoda | .................. F02D 41/065 123/445 |

* cited by examiner

CONTROL APPARATUS FOR AUTOMATICALLY RESTARTING AN INTERNAL COMBUSTION ENGINE

BACKGROUND OF THE INVENTION

1. Field of the Invention

The invention relates to a control apparatus for an internal combustion engine.

2. Description of Related Art

As disclosed by Japanese Patent Application Publication No. 2011-99357 (JP-2011-99357 A), a control apparatus for an internal combustion, engine that is mounted on a vehicle such as an automobile or the like is equipped with a crank position sensor that detects a crank angle of the engine. This crank position sensor is located in the vicinity of a crank rotor that is fixed to a crankshaft of the internal combustion engine. Besides, a missing tooth and a plurality of protrusions are formed on the crank rotor. Daring integral rotation of the crank rotor with the crankshaft, when the plurality of the protrusions formed on the crank rotor pass the vicinity of the crank position sensor, a crank signal is output from the sensor. Besides, when the missing tooth formed on the crank rotor passes the vicinity of the crank position sensor, a missing tooth signal is output from the sensor. The control apparatus for the internal combustion engine detects a crank angle of the internal combustion engine on the basis of a crank signal from the crank position sensor. When a missing tooth signal is output from the sensor, a deviation of the aforementioned detected crank angle from an appropriate value is corrected.

An appropriate crank angle at the time when a missing tooth signal is output from the crank position sensor is determined in advance. In consequence, when the missing tooth signal is output, it can be determined whether or not the detected crank angle is deviant from the appropriate value. If the detected crank angle is deviant from the appropriate value, it can be corrected to the appropriate value. The cause of the deviation of the detected crank angle from the appropriate value includes a case where noise is generated in a signal output from the crank position sensor and the noise is erroneously recognized as a crank signal, a case where noise is generated in a signal output from the crank position sensor and a crank signal cannot be appropriately recognized due to the noise, and the like.

There is known an internal combustion engine that is mounted on a vehicle such as an automobile or the like and is automatically stopped and automatically restarted up during idle operation with a view to improving fuel economy. This automatic stop of the internal combustion engine is carried out by stopping fuel injection from fuel injection valves in the engine in the case where there is no request for the traveling of the automobile during idle operation of the engine, etc. Besides, automatic restart-up of the internal combustion engine in an automatically stopped state is carried out upon the fulfillment of an automatic restart-up condition, for example, when the automobile may travel. More specifically, fuel injection from the fuel injection valves is begun while cranking the internal combustion, engine. Fuel injected from the fuel injection valves is sucked into cylinders (combustion chambers) together with air in an intake passage, and is ignited by ignition plugs in a state of being mixed with air in the cylinders. Then, the fuel thus ignited burns, whereby autonomous operation of the internal combustion engine is begun to complete automatic restart-up of the engine.

It is preferable that automatic restart-up of the internal combustion engine in an automatically stopped state be swiftly completed after the beginning of cranking for automatic restart-up. In order to realize this, it is important to appropriately supply fuel to the cylinder in which a piston is stopped in an intake stroke, among the respective cylinders of the internal combustion engine in an automatically stopped state, after the beginning of automatic restart-up, accurately ignite the fuel in an initial compression stroke, and thereby make a combustion process of the fuel favorable. Incidentally, in the control apparatus for the internal combustion engine, which is automatically stopped and automatically restarted up, the detected crank angle is held during automatic stop as well. Therefore, fuel injection and ignition after the beginning of automatic restart-up can be carried out on the basis of the crank angle.

However, during automatic stop of the internal combustion engine as well, the detected crank angle may deviate from an appropriate value as a result of the generation of noise in a signal that is output from the crank position sensor. If the crank angle thus deviates from the appropriate value, ignition after the beginning of automatic restart-up of the internal combustion engine cannot be carried out at an appropriate timing. Furthermore, such a deviation may hinder efforts to make the initial combustion process of fuel after the beginning of automatic restart-up favorable. In order to cope with this problem, the following method is conceivable. That is, initial ignition after the beginning of automatic restart-up is carried out after a missing tooth signal is output from the crank position sensor after the beginning of automatic restart-up, more specifically, after the deviation of the aforementioned detected crank angle from the appropriate value is corrected on the basis of the outputting of the missing tooth signal. In this case, initial ignition after, the beginning of automatic restart-up is not carried out on the basis of the detected crank angle, with the crank angle deviant from the appropriate value. Therefore, the occurrence of the aforementioned problem can be avoided.

As described above, in automatically restarting up the internal combustion engine which is in an automatically stopped state, if initial ignition after the beginning of automatic restart-up is carried out on the basis of the crank angle, after a missing tooth, signal is output from the crank, position sensor and the crank angle is corrected, the combustion process of fuel based on the initial ignition can be made favorable. However, a missing tooth signal may not be output from the crank position sensor immediately after the beginning of automatic restart-up of the internal combustion engine which is in an automatically stopped state. Accordingly, the outputting of the missing tooth signal may be delayed if the crank angle of the internal combustion engine which is in, an automatically stopped state assumes a certain value. In the case where the outputting of the aforementioned missing tooth signal after the beginning of automatic restart-up is thus delayed, the completion of automatic restart-up of the internal combustion engine is delayed correspondingly.

SUMMARY OF THE INVENTION

The invention provides a control apparatus for an internal combustion engine that can realize the completion of automatic restart-up at an early stage by carrying out the combustion of fuel at a stage as early as possible after the beginning of automatic restart-up, while making an initial combustion process of fuel after the beginning of automatic restart-up favorable.

A control apparatus according to one aspect of the invention, includes a crank position sensor, a crank angle detection device, and a controller. The crank position sensor outputs a crank signal in response to passage of a plurality of protrusions formed on a crank rotor when the crank rotor that is fixed to a crankshaft of the internal combustion engine rotates with the crankshaft. The crank angle detection device detects a crank angle of the internal combustion engine based on the crank signal from the crank position sensor and corrects a deviation of the detected crank angle from an appropriate value when a missing tooth signal corresponding to a missing tooth formed on the crank rotor is output from the crank position sensor. The controller configured to perform fuel injection and ignition in each of cylinders in the internal combustion engine on a basis of the crank angle. The controller is configured to perform a first start-up processing when a stop position of the piston resulting from the automatic stop is in a first start-up execution range that is part of a range, in which the piston stops in the cylinder that is in an intake stroke among the cylinders of the internal combustion engine, and that is on an advance side of a threshold in terms of crank angle, wherein, in the first start-up processing, fuel injection is performed at, beginning of the automatic restart-up in the cylinder that is in the intake stroke and ignition is performed in a subsequent initial compression stroke in the same cylinder. The controller is configured to perform a second start-up processing when the stop position of the piston resulting from the automatic stop is in a second start-up execution range that is part of a range, in which the piston stops in the cylinder that is in the intake stroke among the cylinders of the internal combustion engine, and that is on a retard side of the threshold in terms of crank angle, wherein, in the second start-up processing, initial fuel injection is performed in the cylinder that next enters an intake stroke among the cylinders of the internal combustion engine after beginning of automatic restart-up and initial ignition is performed in a subsequent compression stroke in the same cylinder. The controller is configured to narrow the first start-up execution range by shifting the threshold on the advance side when an amount of deviation from a value of the detected crank angle at a time point of completion of the automatic stop is equal to or larger than a reference value during the of the internal combustion engine. The controller is configured to enlarge the first start-up execution range by shifting the threshold on the retard side when the amount of deviation is smaller than the reference value during the automatic stop of the internal combustion engine.

By variably setting the threshold that defines the first start-up execution range and the second start-up execution range as described above, the completion of automatic restart-up can be realized at an early stage by carrying out the combustion of fuel at a stage as early as possible after the beginning of automatic restart-up, while an initial combustion process of fuel can be made favorable by carrying out initial ignition after the beginning of automatic restart-up at an appropriate timing.

Besides, in the control apparatus according to the aspect of the invention, the controller may be, configured to set the threshold at a time when the amount of deviation is equal to or larger than the reference value to such a value that the missing tooth signal from the crank position sensor can be recognized to have been output, after beginning of cranking for automatic restart-up under a situation where the stop position of the piston resulting from automatic stop is in the first start-up execution range. Furthermore, the controller may be configured to perform ignition after the missing tooth signal is recognized to have been output from the crank position sensor after beginning of cranking for automatic restart-up, when the amount of deviation is equal to or larger than the reference value.

Besides, the control apparatus according to the aspect of the invention may comprises a cam position sensor that outputs a cam signal corresponding to passage of the plurality of the protrusions formed on the cam rotor at a shorter interval than the missing tooth signal, when the cam rotor that is fixed to the camshaft of the internal combustion engine rotates integrally with the camshaft. Besides, the controller may be configured to perform ignition after the missing tooth signal is recognized to have been output from the crank position sensor, after beginning of cranking for automatic restart-up, when amount of deviation is smaller than the reference value. Furthermore, the controller may be configured to perform ignition on a condition that it be determined that an appropriate value of the crank angle corresponding to the cam signal matches the detected crank angle, when the cam signal is output from the cam position sensor before the missing tooth signal is recognized to have been output.

Besides, in the control apparatus according to the aspect of the invention, the controller may be configured to set the threshold at a time when the amount of deviation is smaller than the reference value to such a value that misfire is not caused during initial combustion of fuel through the first start-up processing.

Besides, in the control apparatus according to the aspect of the invention, the controller may be configured to set the threshold at a time when the amount of deviation is smaller than the reference value to such a value that self-ignition of fuel is not caused during initial combustion of the fuel through the first start-up processing.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

One embodiment in which the invention is applied to a four-cylinder internal combustion engine for an automobile will be described hereinafter with reference to FIGS. 1 to 8. In an internal combustion engine 1 shown in FIG. 1, a throttle valve 13 is provided in an openable/closable manner in an intake passage 3 that leads to a combustion chamber 2 of each cylinder. Air is sucked into the combustion chamber 2 through this intake passage 3, and fuel which is injected from a fuel injection valve 4 toward an intake port 3a of the engine 1 is supplied to the combustion chamber 2. When an ignition plug 5 ignites this mixture of air and fuel, the air-fuel mixture burns to cause a piston 6 to move in a reciprocating manner. As the piston 6 moves in a reciprocating manner, a crankshaft 7 as an output shaft of the internal combustion engine 1 rotates. The air-fuel mixture that has burned in the combustion chamber 2 is delivered to an exhaust passage 8 as exhaust gas. A starter 10 is connected to the crankshaft 7. In starting up the internal combustion engine 1, the starter 10 forcibly rotates the crankshaft 7 (carries out cranking).

Figure 1:
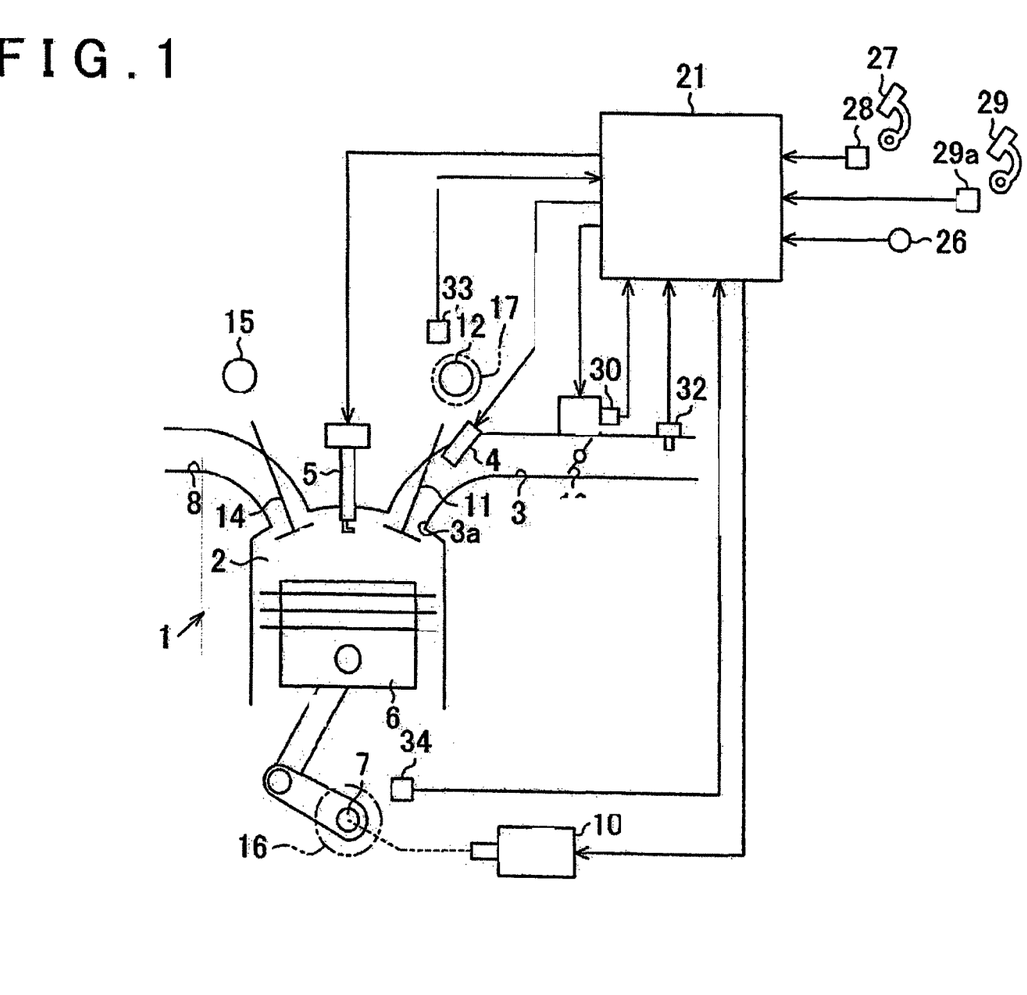
FIG. 1 is a schematic diagram showing an entire internal combustion engine to which a control apparatus according to the invention is applied.

An intake valve 11 operates in an opening/closing manner to establish or shut off communication between the combustion chamber 2 and the intake passage 3 in the internal combustion engine 1. This intake valve 11 operates in an opening/closing manner as an intake camshaft 12 which receives rotation transmitted from the crankshaft 7 rotates. Besides, an exhaust valve 14 operates in an opening/closing manner to establish or shut off communication between the combustion chamber 2 and an exhaust passage 8 in the internal combustion engine 1. This exhaust valve 14 operates in an opening/closing manner as an exhaust camshaft 15 which receives toration transmitted from the crankshaft 7 rotates.

Figure 2:
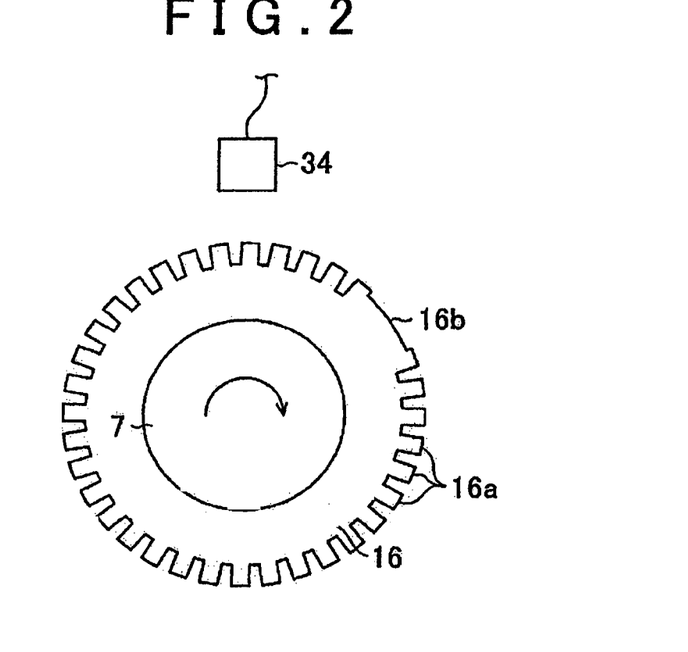
FIG. 2 is a schematic diagram showing a crank rotor and a crank position sensor on an enlarged scale.

As shown in FIG. 2, a crank rotor 16 is fixed to the crankshaft 7. A total of 34 protrusions 16a are formed on an outer peripheral portion of the crank rotor 16 at intervals of a predetermined angle (10° in this embodiment of the invention) around an axis of the crankshaft 7, and a missing tooth 16b is formed on the outer peripheral portion of the crank rotor 16. A crank position sensor 34 is provided in the vicinity of this crank rotor 16. When the crankshaft 7 rotates, the respective protrusions 16a and the missing tooth 16b of the crank rotor 16 sequentially pass beside the crank position sensor 34. As a result, every time the crank angle advances by 10°, a pulsing crank signal corresponding to each of the protrusions 16a is output from the crank position sensor 34. Besides, when the crank angle (° CA) is equal to, for example, 120° CA or 480° CA, a missing tooth signal corresponding to the missing tooth 16b is output from the crank position sensor 34. This missing tooth signal is three times as wide as a crank signal corresponding to each of the protrusions 16a (has a width of 30°). The crank position sensor 34 also has a function of outputting a signal corresponding to a rotational direction of the crankshaft 7, namely, a signal corresponding to positive rotation or a signal corresponding to reverse rotation. Then, various signals output from the crank position sensor 34 are used in determining a crank angle of the internal combustion engine 1, obtaining an engine rotational speed, or the like.

Figure 3:
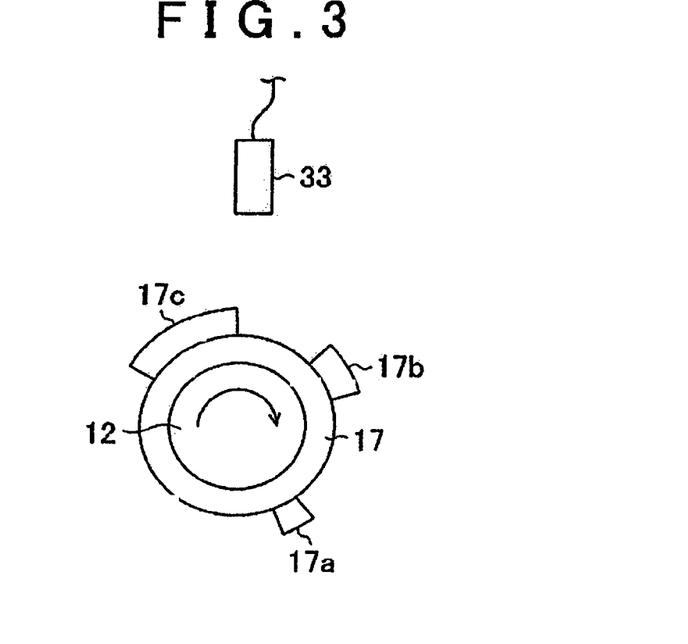
FIG. 3 is a schematic diagram showing a cam rotor and a cam position sensor on an enlarged scale.

As shown in FIG. 3, the intake camshaft 12 is provided with a cam rotor 17. A total of three protrusions 17a to 17c are provided on an outer peripheral portion of the cam rotor 17. A cam position sensor 33 is provided in the vicinity of this cam rotor 17. When the intake camshaft 12 rotates, the respective protrusions 17a to 17c of the cam rotor 17 sequentially pass beside the cam position sensor 33. As a result, a pulsed cam signal corresponding to each of the protrusions 17a to 17c is output from, the cam position sensor 33. The interval at which this cam signal is output is shorter than the at which a missing tooth signal is output from the aforementioned crank position sensor 34. That is, the respective protrusions 17a to 17c of the cam rotor 17 are formed such that the interval at which a cam signal is output from the cam position sensor 33 becomes shorter than the interval at which a missing tooth signal is output from the crank position sensor 34. The cam signal output from the cam position sensor 33 is used to identify each cylinder of the internal combustion engine 1.

Next an electric configuration of the control apparatus for the internal combustion engine 1 will be described with reference to FIG. 1. The automobile that is mounted with the internal combustion engine 1 is equipped with an electronic control unit 21 that performs various kinds of control regarding the operation of the engine 1. This electronic control unit 21 is equipped with a CPU, a ROM, a RAM, input/output ports, and the like. The CPU performs various arithmetic processings regarding the aforementioned control. Programs and data required for the control are stored in the ROM. The RAM temporarily stores an arithmetic result of the CPU and the like. Signals are input to the input ports from the outside, or are output from the output ports to the outside.

The cam position sensor 33 and the crank position sensor 34 are connected to the input port of the electronic control unit 21. Besides, various sensors that will be mentioned below and the like are also connected to this input port. These sensors include a vehicle speed sensor 26 that detects a traveling speed of the automobile (a vehicle speed), an accelerator position sensor 28 that detects a depression amount of an accelerator pedal 27 that is operated to be depressed by a driver of the automobile (an accelerator depression amount), a brake switch 29a that detects operations of turning on and off a brake pedal 29 that is operated to be depressed by the driver, a throttle position sensor 30 that detects an opening degree of the throttle valve 13 that is provided in the intake passage 3 (a throttle opening degree), and an airflow meter 32 that detects an amount of air passing through the intake passage 3 (an intake air amount).

Drive circuits of various instruments such as a drive circuit, of the fuel injection valve 4, a drive circuit of the ignition plug 5, a drive circuit of the starter 10, a drive circuit of the throttle valve 13 etc., and the like are connected to the output port of the electronic control unit 21.

The electronic control unit 21 detects, on the basis of detection signals input thereto from the aforementioned various sensors, an engine operation state such as an engine rotational speed and an engine load (an amount of air that is sucked into the combustion chamber 2 per cycle of the internal combustion engine 1). The engine load is calculated from an intake air amount and an engine rotational speed of the internal combustion engine 1, which are obtained on the basis of detection signals of the accelerator position sensor 28, the throttle position sensor 30, the airflow meter 32, and the like. The electronic control unit 21 outputs command signals to the various drive circuits that are connected to the aforementioned output port, in accordance with an engine operation state such as an engine load and an engine rotational speed. In this manner, fuel injection control, ignition timing control, intake air amount control, drive control for the starter 10, and the like in the internal combustion engine 1 are performed through the electronic control unit 21.

Besides, the electronic control unit 21 detects a crank angle of the internal combustion engine 1 on the basis of a cam signal from the cam position sensor 33 and a crank signal from the crank position sensor 34. Then, fuel injection from the fuel injection valve 4 and ignition by the ignition plug 5 are carried out at appropriate timings in each of the cylinders of the internal combustion engine 1, on the basis of the detected crank angle, through the fuel injection control and the ignition timing control by the electronic control unit 21. Furthermore, when a missing tooth signal is output from the crank position sensor 34, the electronic control unit 21 corrects a deviation of the detected crank angle from an appropriate value. Causes of the detected crank angle from the appropriate value include, for example, a case where noise is generated in a signal output from the crank position sensor 34 and is erroneously recognized as a crank signal.

Next, the control of automatically stopping and restarting up the internal combustion engine 1 during idle operation with a view to improving fuel economy of the internal combustion engine 1 will be described. If a predetermined automatic stop condition is fulfilled during idle operation, the internal combustion engine 1 is automatically stopped. Examples of the aforementioned automatic stop condition include a condition that the accelerator operation amount be equal to "0" and there be no request for an output of the internal combustion engine 1, a condition that the vehicle speed be equal to "0", a condition that the brake pedal 29 be depressed (be operated to be turned on), and the like. Then, if all these conditions are fulfilled, it is determined that the automatic stop condition is fulfilled. If it is thus determined that the automatic stop condition is fulfilled, fuel injection from the fuel injection valve 4 is stopped. Fuel injection is thus stopped under a situation where the throttle valve 13 is fully closed during idle operation of the engine 1. Autonomous operation of the internal combustion engine 1 is gradually stopped due to the stop of fuel injection from the fuel injection valve 4. Thus, the engine rotational speed gradually falls. The internal combustion engine 1 reversely rotates immediately before the eventual stop of engine rotation, due to a repulsive force of compressed air in the cylinder that is in a compression stroke. As a result of this reverse rotation of the internal combustion engine 1, the piston 6 moves from an intake bottom dead center (BDC) to an intake top dead center (TDC), and then stops in the course of an intake stroke. By stopping engine rotation as described above, fuel economy of the internal combustion engine 1 is improved.

Besides, when an automatic restart-up condition of the internal combustion engine 1 is fulfilled with engine rotation stopped due to automatic stop of the internal combustion engine 1, the internal combustion engine 1 is restarted up. Examples of the aforementioned automatic restart-up condition include a condition that the accelerator operation amount be larger than "0", a condition that the brake pedal 29 be released from depression (be operated to be turned off), and the like. If at least one of these conditions is fulfilled, it is determined that the automatic restart-up condition is fulfilled. If it is thus determined that the automatic restart-up condition is fulfilled, the internal combustion engine 1 is cranked through the driving of the starter 10. Besides, fuel injection from the fuel injection valve 4 is started during the cranking. Thus, fuel that has been injected from the fuel injection valve 4 toward the intake port 3a is sucked into the cylinder (the combustion chamber 2), through the movement of the piston 6 toward the intake bottom dead center in an intake stroke. Furthermore, together with the aforementioned fuel, air is also sucked into the combustion chamber 2 from the intake port 3a. Subsequently, the fuel that has been mixed with air in the combustion chamber 2 is ignited by the ignition plug 5. Fuel burns through the ignition, whereby autonomous operation of the internal combustion engine 1 is started and restart-up of the engine 1 is completed.

It is preferable that automatic restart-up of the internal combustion engine 1 in an automatically stopped state be swiftly completed after the beginning of cranking for automatic restart-up. In order to realize this, it is important to appropriately supply fuel after the beginning of automatic restart-up, accurately ignite the fuel in a first compression stroke, and thus make a combustion process of the fuel favorable, in the cylinder in which the piston 6 is stopped in an intake stroke, among the respective cylinders of the internal combustion engine 1 that is in an automatically stopped state. Incidentally, in the control apparatus for the internal combustion engine 1 that is automatically stopped and automatically restarted up, a crank angle that is detected on the basis of a crank signal from the crank position sensor 34 is retained by the RAM of the electronic control unit 21 during automatic stop as well. Accordingly, fuel injection and ignition after the beginning of automatic restart-up can be carried out on the basis of the crank angle.

However, during automatic stop of the internal combustion engine 1 as well, as a result of the generation of noise in a signal output from the crank position sensor 34, the detected crank angle may deviate from an appropriate value. If the crank angle thus deviates from the appropriate value, ignition cannot be carried out at an appropriate timing after the beginning of automatic restart-up of the internal combustion engine 1. Moreover, such a deviation may hinder efforts to make the initial combustion process of fuel after the beginning of automatic restart-up favorable. In order to cope with this problem, the following method is conceivable. That is, when a missing tooth signal is output from the crank position sensor 34 after the beginning of cranking for automatic restart-up, the deviation of the detected crank angle from the appropriate value is corrected. After the deviation of the aforementioned detected crank angle from the appropriate value is thus corrected, initial ignition after the beginning of automatic restart-up is carried out. However, it may be impossible to immediately correct the deviation of the detected crank angle from the appropriate value after the beginning of automatic restart-up of the internal combustion engine which is in an automatically stopped state. In that case, the completion of automatic restart-up of the internal combustion engine is retarded by a time that is required for the correction.

Thus, in this embodiment of the invention, with a view to realizing the completion of automatic restart-up at an early stage by carrying out the combustion of fuel at a stage as early as possible after the beginning of automatic restart-up while making the initial combustion process of fuel after the beginning of automatic restart-up favorable, the following processings [1] to [3] are performed during automatic restart-up.

[1] A first start-up execution range is set as a range in which the piston 6 stops in the cylinder that is in an intake stroke, among the cylinders of the internal combustion engine 1, and that is on an advance side of a threshold in terms of crank angle. A second start-up execution range is set as a range that is on a retard side of the threshold in the intake stroke.

[2] If a stop position of the piston 6 resulting from automatic stop is in the first start-up execution range, a first start-up processing is performed. In the first start-up processing, fuel injection is performed at beginning of the automatic restart-up in the cylinder that is in the intake, stroke and ignition is performed in a subsequent initial compression stroke in the same cylinder. If the stop position of the piston 6 resulting from automatic stop is in the second start-up execution range, a second start-up processing is performed. In the second start-up processing, initial fuel injection is performed in the cylinder that next enters an intake stroke among the cylinders of the internal combustion engine 1 after the beginning of automatic restart-up and initial ignition is performed in a subsequent compression stroke in the same cylinder.

[3] When an amount Z of deviation of the detected crank angle from a value at a time point of the completion of automatic restart-up is equal to or larger than a predetermined reference value during automatic stop of the internal combustion engine 1, the threshold is shifted on the advance side to narrow the first start-up execution range. If the amount Z of deviation is smaller than the reference value, the threshold is shifted on the retard side to enlarge the first start-up execution range.

Next, the operation of the control apparatus for the internal combustion engine 1 according to this embodiment of the invention will be described. If the stop position of the piston 6 in the cylinder that is in an intake stroke among the cylinders of the internal combustion engine 1 which is in an automatically stopped state is in the first start-up execution range, the first start-up processing is performed during automatic restart-up of the internal combustion engine 1. In this first start-up processing, the fuel is combusted by ignition in an initial compression stroke in the cylinder after the beginning of automatic restart-up. Accordingly, the combustion of fuel can be realized at an early stage after the beginning of automatic restart-up.

If the stop position of the piston 6 in the cylinder that is in an intake stroke among the cylinders of the internal combustion engine 1 which is in an automatically stopped state is in the second start-up execution range, the second start-up processing is performed during automatic restart-up of the internal combustion engine 1. In this second start-up processing, the variation width of the crank angle from a time point of the beginning of automatic restart-up to a time point of initial ignition is large. In this case, between the beginning of cranking and ignition, the missing tooth of the crank rotor is likely to pass the vicinity of the crank position sensor 34, and a missing signal is likely to be output from the sensor 34. In other words, between the ginning of cranking and ignition, a deviation of the detected crank angle from an appropriate value is likely to be corrected on the basis of the outputting of a missing tooth from the crank position sensor 34. Since the crank angle is thus corrected, initial ignition in a compression stroke after the beginning of automatic restart-up can be performed at an appropriate timing on the basis of an appropriate crank angle. Furthermore, the initial combustion process of fuel after the beginning of automatic restart-up can be made favorable.

If the amount Z of deviation of the detected crank angle from the value at the time of the completion of automatic stop is smaller than the reference value, namely, if the detected crank angle is unlikely to be deviant from the appropriate value during automatic stop of the internal combustion engine 1, the first start-up execution range is enlarged through the aforementioned processing [3]. Thus, if the detected crank angle is unlikely to be deviant from the appropriate value, the frequency with which the first start-up processing is performed during automatic restart-up can be enhanced. By enhancing the frequency with which the first start-up processing is performed during automatic restart-up, the combustion of fuel at an early stage after the beginning of automatic restart-up can be realized, and moreover, the completion of automatic restart-up at an early stage can be realized.

If the first start-up execution range is enlarged as described above, the variation width of the crank angle from the beginning of automatic restart-up to initial ignition in the first start-up processing may become small. As a result, between the beginning of cranking and ignition, a missing tooth signal may not be output from the crank position sensor 34. If a missing tooth signal is not output from the crank position sensor 34 between the beginning of cranking and ignition, the detected crank angle cannot be corrected on the basis of the outputting of the missing tooth signal. However, en if the crank angle cannot be corrected, the possibility of the crank angle being deviant from the appropriate value is low. In consequence, the infeasibility of the correction does not cause a problem.

If the amount Z of deviation of the detected crank angle from the value at the time point of the completion of automatic stop is equal to or larger than the reference value during automatic stop of the internal combustion engine 1, the first start-up execution range is narrowed (the second start-up execution range is enlarged) through the aforementioned processing [3]. Thus, if the detected crank angle is likely to be deviant from the appropriate value, the frequency with which the second start-up processing is performed during automatic restart-up can be enhanced. By enhancing the frequency with which the second start-up processing is performed during automatic restart-up, the feasibility of the correction of the crank angle based on the outputting of a missing tooth signal from the crank position sensor 34 can be enhanced between the beginning of cranking and ignition. Since the crank angle is thus corrected, ignition can be performed at an appropriate timing after the beginning of automatic restart-up, and the combustion process of fuel based on the ignition can be made favorable.

As described above, the first start-up execution range and the second start-up execution range are narrowed and enlarged. Thus, while the initial combustion process of fuel can be made favorable by performing initial ignition at an appropriate timing after the beginning of automatic restart-up, the completion of automatic restart-up at an early stage can be realized by performing the combustion of fuel at a stage as early as possible after the beginning of automatic restart-up.

Figure 4A:
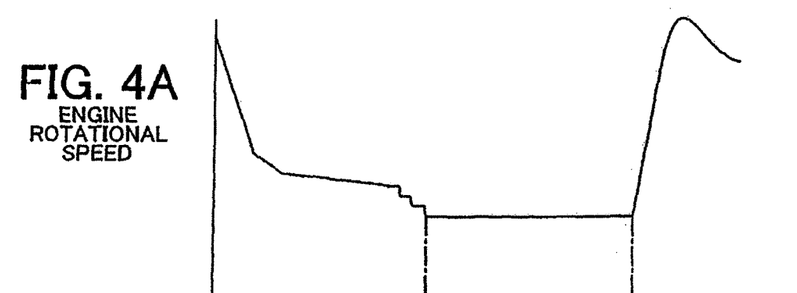
FIGS. 4A to 4F are time charts showing changes in an engine rotational speed, an output pattern of a signal from the crank position sensor, changes in an amount Z of deviation, and changes in the presence/absence of enlargement of a first start-up execution range from the termination of the beginning of automatic stop of the internal combustion engine to the beginning of automatic restart-up of the internal combustion engine.

Next, a concrete procedure of performing the aforementioned processing [3] will be described with reference to a time chart of FIGS. 4A to 4F. If the internal combustion engine 1 is automatically stopped (at a timing T1), the engine rotational speed gradually falls as shown in FIG. 4A. A crank angle at a time point (T2) when the engine rotational speed is equal to "0" is stored into the RAM of the electronic control unit 21, as a crank angle. Cm at the time when automatic stop of the internal combustion engine 1 is completed. Between the completion of automatic stop of the internal combustion engine 1 and the beginning of automatic restart-up (between T2 and T3), the amount Z of deviation of a current crank angle Cr from the crank angle Cm is obtained. The current crank angle Cr is detected on the basis of a signal from the crank position sensor 34.

Figure 4B:
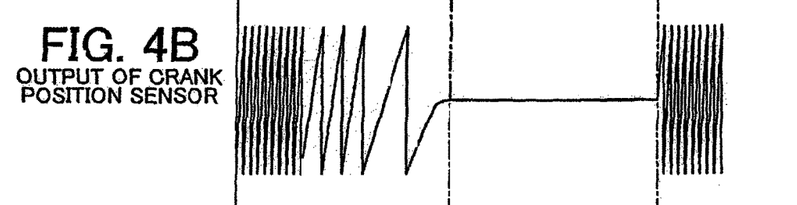
Figure 4C:
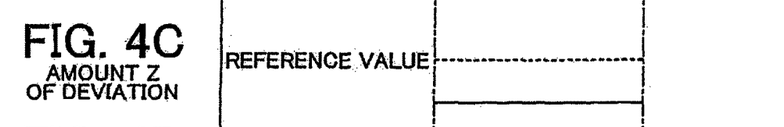
Figure 4D:
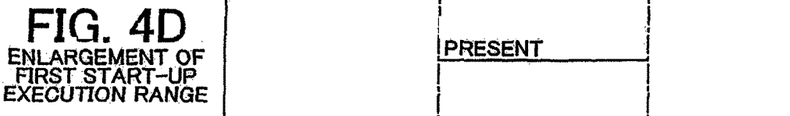
Figure 4E:
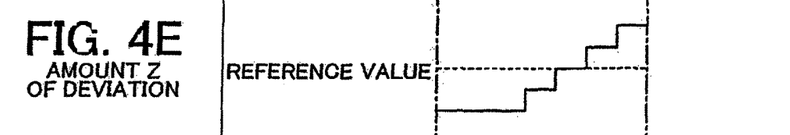

FIG. 4B shows a signal that is output from the crank position sensor 34 from a time point following the beginning of automatic stop of the internal combustion engine 1 to a time point following the beginning of automatic restart-up. If no noise is generated in the signal from the crank position sensor 34 between the completion of automatic restart-up of the internal combustion engine 1 and the beginning of automatic restart-up of the internal combustion engine 1 (between T2 and T3), there is no possibility of noise being erroneously recognized as a crank signal from the crank position sensor 34. As a result, the crank angle Cr does not change. In this case, the amount Z of deviation of the crank angle Cr from the crank angle Cm is held equal to "0" as indicated by a solid line in FIG. 4C, and remains smaller than the reference value (indicated by a broken line). As shown in FIG. 4D, during automatic restart-up of the internal combustion engine 1, the threshold is shifted such that the first start-up execution range is enlarged (the second start-up execution range is narrowed).

Figure 4F:
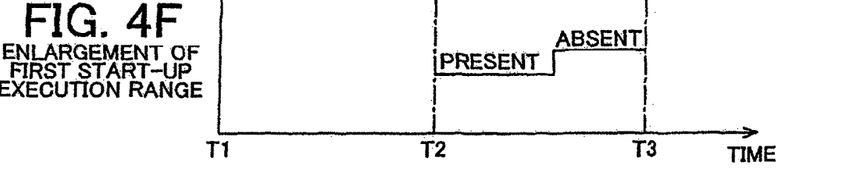

On the other hand, if noise is generated in a signal from the crank position sensor 34 between the completion of automatic stop of the internal combustion engine 1 and the beginning of automatic restart-up of the internal combustion engine 1 (between T2 and T3), the noise is erroneously recognized as a crank signal from the crank position sensor 34, and the crank angle Cr changes. In this case, the amount Z of deviation of the crank angle Cr from the crank angle Cm may increase as indicated by, for example, a solid line in FIG. 4E. If the amount Z of deviation is equal to or larger than the reference value (indicated by a broken line), the threshold is shifted such that the first start-up execution range is not enlarged (the second start-up execution range is not narrowed), in other words, such that the first start-up execution range is narrowed (the second start-up execution range is enlarged) as shown in FIG. 4F during automatic restart-up of the internal combustion engine 1.

Next, a fuel injection mode and an ignition mode in the internal combustion engine 1 after the beginning of automatic restart-up will be described in detail separately as to a case where the amount Z of deviation is equal to or larger than the reference value (hiring automatic stop of the internal combustion engine 1 and a case where the amount Z of deviation is smaller than the reference value during automatic stop of the internal combustion engine 1.

[In Case where Amount Z of Deviation is Equal to or Larger than Reference Value]

Figure 5:
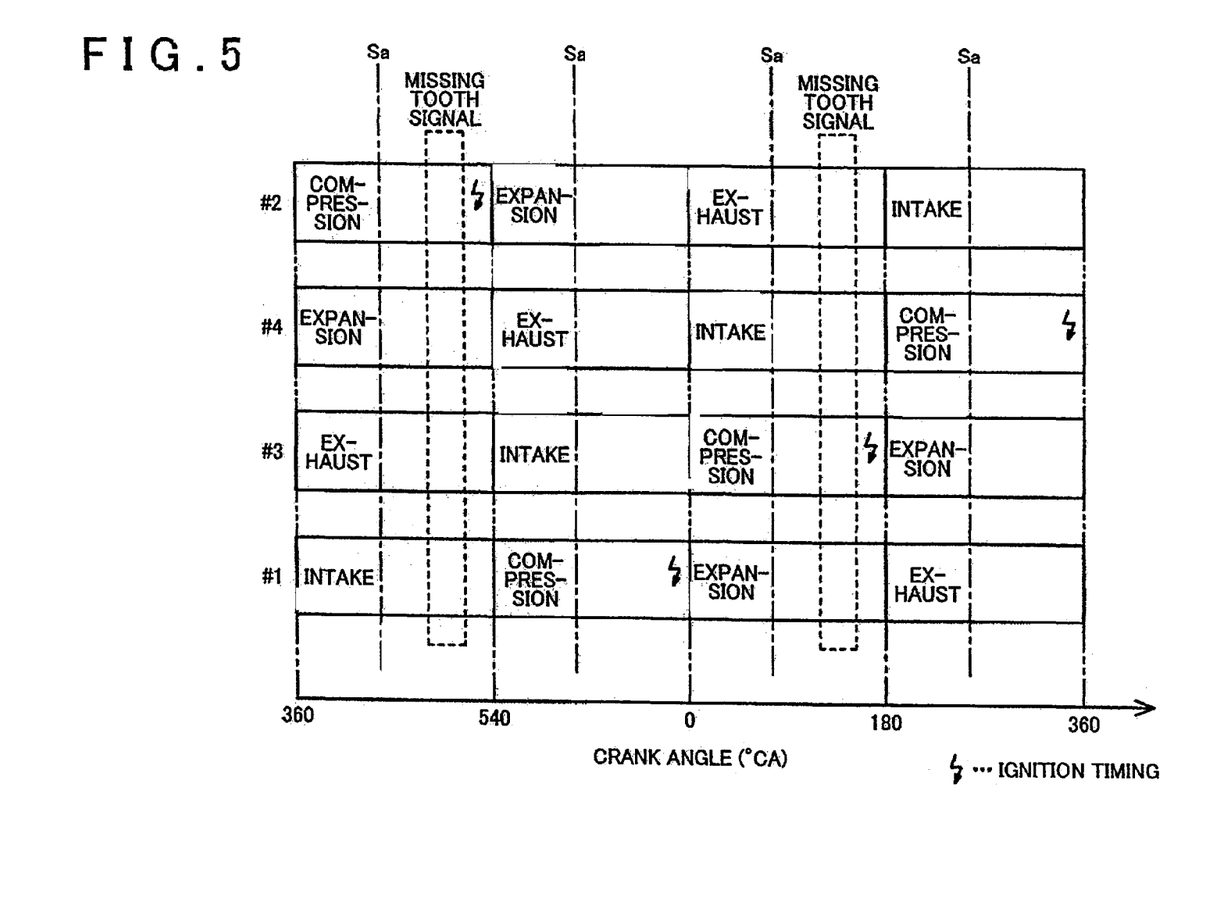
FIG. 5 is an illustrative diagram showing patterns of change of an intake stroke, a compression stroke, an expansion stroke, and an exhaust stroke in each of cylinders of the internal combustion engine with respect to changes in a crank angle.

If the amount Z of deviation is equal to or larger than the reference value during automatic stop of the internal combustion engine 1, the threshold that defines the first start-up execution range and the second start-up execution range is set, to, for example, a value Sa on the advance side as shown in FIG. 5. This threshold (Sa) is set to such a value that the stop position of the piston 6 in the cylinder that is in an intake stroke during automatic stop of the internal combustion engine 1 allows a missing tooth signal to be recognized to have been output from the crank position sensor 34 at a stage as early as possible after the beginning of cranking for automatic restart-up in the first start-up execution range.

If the cylinder that is in an intake stroke during automatic stop is the first cylinder #1 or the fourth cylinder #4 and the stop position of the piston 6 in each of those cylinders is in the first start-up execution range, a missing tooth signal is output from the crank position sensor 34 immediately after the beginning of cranking for automatic restart-up. However, if the time point of the beginning of the cranking and the time point of the outputting of the missing tooth signal are too close to each other, it is difficult to determine whether or not the missing tooth signal has been output. This is related to the fact that it is determined, on the basis of an abrupt change in the output period of a pulsing signal from the crank position sensor 34, that a missing tooth signal has been output, in consideration of the output period of the missing tooth signal being longer than the output period of a crank signal. That is, immediately after the beginning of cranking, the engine rotational speed is low, and hence the output period of the crank signal tends to be long. Thus, when a crank signal and a missing tooth signal are sequentially output, the output periods of the respective signals do not abruptly change. Accordingly, it cannot be recognized that the missing tooth signal has been output.

In order to prevent such an event, the aforementioned threshold (Sa) is set to such a value that the stop position of the piston 6 in the cylinder that is in an intake stroke during automatic stop of the internal combustion engine 1 allows a missing tooth signal to be recognized to have been output from the crank position sensor 34 at a stage as early as possible after the beginning of cranking for automatic restart-up in the first start-up execution range. The threshold (Sa) is a value that is on the advance side with a predetermined interval from the output period of the missing tooth signal, for example, ATDC 80° under the condition that the cylinder that is in an intake stroke during automatic stop be the first cylinder #1 or the fourth cylinder #4.

In the case where the amount Z of deviation is equal to or larger than the reference value during automatic stop of the internal combustion engine 1, even if the first start-up processing or the second start-up processing is performed, ignition is begun after a missing tooth signal is recognized to have been output from the crank position sensor 34 after the beginning of cranking for automatic restart-up. In other words, a deviation of the detected crank angle from an appropriate value is corrected on the basis of the outputting of the missing tooth signal, and then initial ignition after the beginning of automatic restart-up is carried out.

In this case, when the first start-up processing is performed during automatic restart-up under a situation where the amount Z of deviation is equal to or larger than a reference value and the detected crank angle is likely to be deviant from an appropriate value, initial ignition can be carried out at an early stage and at an appropriate timing after the beginning of automatic restart-up. For example, in the case where the cylinder that is in an intake stroke among the cylinders of the internal-combustion engine 1 is the first cylinder #1 or the fourth cylinder #4, fuel injection is carried out in the cylinder that is in the intake stroke at the beginning of cranking in the first start-up processing. Before the cylinder shifts to a compression stroke, a missing tooth signal is recognized to have been output from the crank position sensor 34. A deviation of the detected crank angle from an appropriate value is corrected on the basis of the outputting of this missing tooth signal. Subsequently, if the cylinder enters an initial compression stroke after the beginning of automatic restart-up, ignition is carried out at an early stage during the compression stroke at an appropriate timing, on the basis of the aforementioned corrected crank angle. The initial combustion process of fuel after automatic restart-up can be made favorable through this ignition. Besides, in the case where the cylinder that is in an intake stroke among the cylinders of the internal combustion engine 1 is the second cylinder #2 or the third cylinder #3, fuel injection is carried out in the cylinder that enters the intake stroke at the beginning of cranking in the first start-up processing. After the cylinder shifts to a compression stroke, a missing tooth signal is recognized to have been output from the crank position sensor 34. The deviation of the detected crank angle from the appropriate value is corrected on the basis of the outputting of this missing tooth signal. Subsequently, while the cylinder is in the initial compression stroke after the beginning of automatic restart-up, namely, at an early stage during the compression stroke, ignition is carried out at an appropriate timing on the basis of the aforementioned corrected crank angle. The initial combustion process of fuel after the beginning of automatic restart-up can be made favorable through this ignition.

On the other hand, in the case where the second start-up processing is performed instead of the first start-up processing during the aforementioned automatic restart-up, initial ignition after the beginning of automatic restart-up is carried out after a missing tooth signal is recognized to have been output from the crank position sensor 34. Accordingly, the ignition can be carried out at an appropriate timing. For example, in the case where the cylinder that is in an intake stroke among the cylinders of the internal combustion engine 1 which is in an automatically stopped state is the first cylinder #1 or the fourth cylinder #4, initial fuel injection is carried out in the second cylinders (#3 and #2) that next enter an intake stroke among the cylinders of the internal combustion engine after the beginning of automatic restart-up. After the cylinder shifts to a compression stroke, a missing tooth signal is recognized to have been output. A deviation of the detected crank angle from an appropriate value is corrected on the basis of the outputting of this missing tooth signal. Subsequently, while the cylinder is in a compression stroke, initial ignition after the beginning of automatic restart-up is carried out at an appropriate timing, on the basis of the aforementioned corrected crank angle. The initial combustion process of fuel after the beginning of automatic restart-up can be made favorable through this ignition. Besides, in the case where the cylinder that is in an intake stroke among the cylinders of the internal combustion engine 1 which is in an automatically stopped state is the second cylinder #2 or the third cylinder #3, initial fuel injection is carried out in the second cylinders (#1 and #4) that enter an intake stroke among the cylinders of the internal combustion engine 1 after the beginning of automatic restart-up in the second start-up processing. Before the cylinder shifts to a compression stroke, a missing tooth signal is recognized to have been output from the crank position sensor 34. The deviation of the detected crank angle from the appropriate value is corrected on the basis of the outputting of this missing signal. Subsequently, in an immediately subsequent compression stroke in the same cylinder, initial ignition after the beginning of automatic restart-up is carried out at an appropriate timing on the basis of the aforementioned corrected crank angle. The initial combustion process of fuel after the beginning of automatic restart-up can be made favorable through this ignition.

[In Case where Amount Z of Deviation is Smaller than Reference Value]

Figure 6:
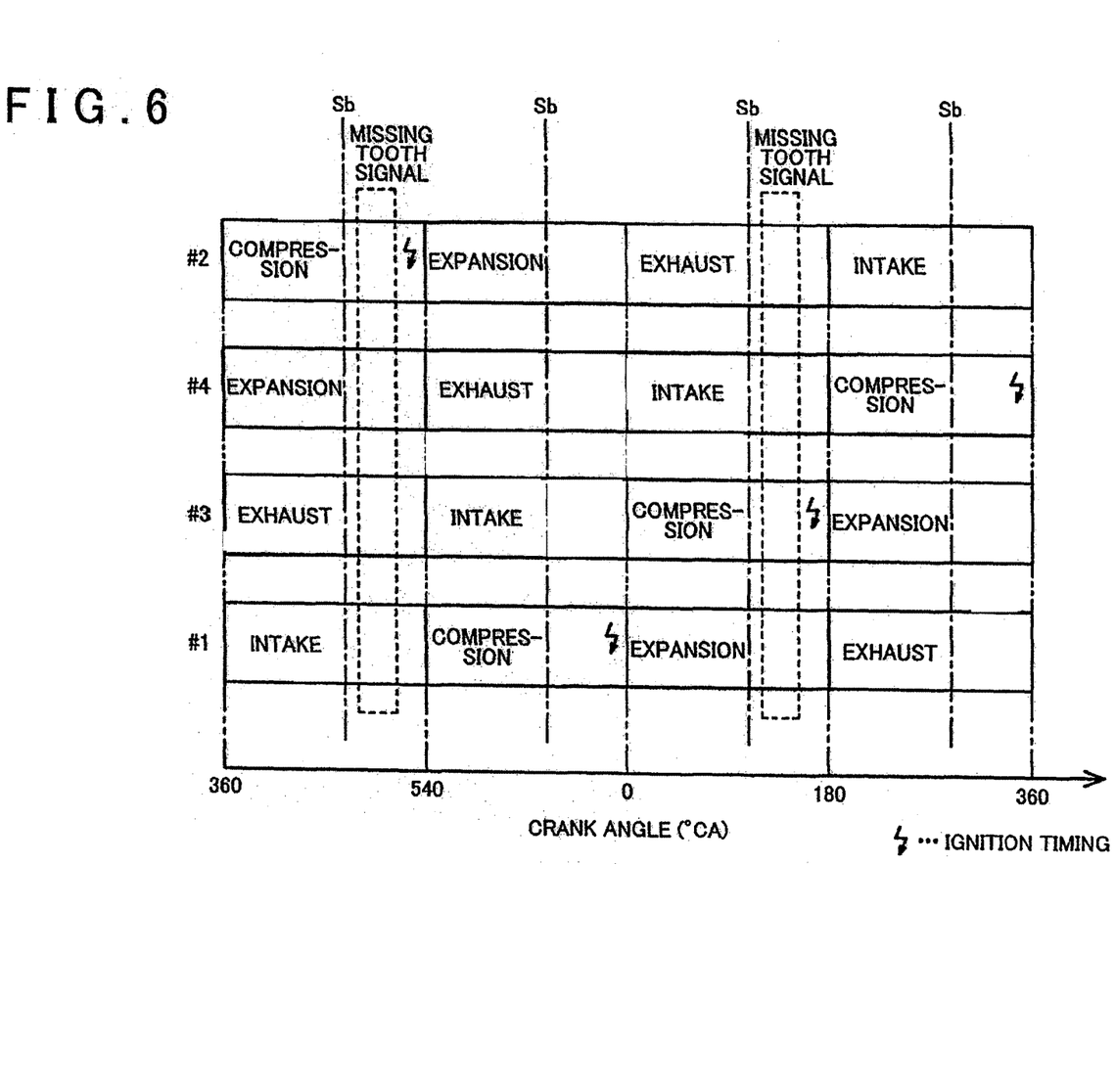
FIG. 6 is an illustrative diagram showing patterns of change of the intake stroke, the compression stroke, the expansion stroke, and the exhaust stroke in each of the cylinders of the internal combustion engine with respect, to changes in the crank angle.

If the amount Z of deviation is smaller than the reference value during automatic stop of the internal combustion engine 1, the threshold that defines the first start-up execution range and the second start-up execution range is set to, for example, a, value Sb on the retard side as shown in FIG. 6. This value Sb is a value that is on the retard side of the value Sa (FIG. 5). As the threshold (Sb) is shifted to the retard side, the possibility of the stop position of the piston 6 in the cylinder that is in an intake stroke at the beginning of the performance of the first start-up processing being close to the bottom dead center increases. Besides, the distance between the stop position of the piston 6 and the bottom dead center decreases, the amount of fuel that is sucked into the cylinder as the piston 6 moves after the beginning of cranking for automatic restart-up decreases. Accordingly, when fuel is burned in the cylinder, misfire is likely to occur. Besides, as the distance between the stop position of the piston 6 and the bottom dead center decreases, the amount of high-temperature air remaining in the cylinder at the beginning of cranking for automatic restart-up increases. Accordingly, when fuel is burned in the cylinder, self-ignition of the fuel is likely to be caused. In this view, the threshold (Sb) is set to such a value that neither misfire nor self-ignition of fuel is caused during the initial combustion of fuel through the first start-up processing, for example, an after top dead center (ATDC) 110°.

In the case where the amount Z of deviation is smaller than the reference value during automatic stop of the internal combustion engine 1, even if the first start-up processing or the second start-up processing is performed, ignition is begun after a missing tooth signal is recognized to have been output from the crank position sensor 34 after the beginning of cranking for automatic restart-up. In other words, after a deviation of the detected crank angle from an appropriate value is corrected on the basis of the outputting of the missing tooth signal, initial ignition after the beginning of automatic restart-up is carried out. Besides, even before the missing tooth signal is recognized to have been output, in other words, even before the deviation of the detected crank angle from the appropriate value is corrected, initial ignition after the beginning of automatic restart-up is carried out upon the outputting of a cam signal from the cam position sensor 33, on the condition that it be determined that an appropriate value of the crank angle corresponding to the cam signal matches the detected crank angle.

More specifically, in the first start-up processing, fuel injection is carried out in the cylinder that is in an intake stroke among the cylinders of the internal combustion engine 1 at the beginning of cranking for automatic restart-up. After that, in the case where a missing tooth signal is recognized to have been output from the crank position sensor 34 before the aforementioned cylinder shifts to a compression stroke, the deviation of the detected crank angle from the appropriate value is corrected on the basis of the outputting of this missing tooth signal. Subsequently, initial ignition after the beginning of automatic restart-up is carried out in the compression stroke. This situation arises when the cylinder that is in an intake stroke among the cylinders of the internal combustion engine 1 at the beginning of cranking for automatic restart-up is the first cylinder #1 or the fourth cylinder #4. Besides, in the case where a missing tooth signal is not recognized to have been output from the crank position sensor 34 in an intake stroke in which initial fuel injection is carried out in these cylinders, by the time a subsequent missing tooth signal is recognized to have been output, a cam signal is recognized, to have been output from the cam position sensor 33. This is because the interval at which a cam signal is output from the cam position sensor 33 is shorter than the interval at which a missing tooth signal is output from the crank position sensor 34. Then, initial ignition after the beginning of automatic restart-up is carried out in the compression stroke, on the condition that it be determined that the appropriate value of the crank angle corresponding to the cam signal matches the detected crank angle when the cam signal is output. Besides, if the cylinder that is in an intake stroke among the cylinders of the internal combustion engine 1 at the beginning of cranking for automatic restart-up is the second cylinder #2 or the third cylinder #3, a earn signal is recognized to have been output from the cam position sensor 33, by the time a missing tooth signal is recognized to have been output from the crank position sensor 34. This is because the interval at which, a cam signal is output from the cam position sensor 33 is output is shorter than the interval at which a missing tooth signal is output from the crank position sensor 34. Initial ignition after the beginning of automatic restart-up is carried out in a compression stroke following the aforementioned intake stroke, on the condition that it be determined that the appropriate value of the crank angle corresponding to the cam signal matches the detected crank angle when the cam signal is output.

On the other hand, in the second start-up processing, cranking for automatic restart-up is begun, and fuel injection is carried out in the second cylinder that next enters an intake stroke among the cylinders of the internal combustion engine 1. After that, in the case where a missing tooth signal is recognized to have been output from the crank position sensor 34 in a compression stroke following the intake stroke, a deviation of the crank angle from an appropriate value is corrected on the basis of the outputting of this missing tooth signal, and initial ignition after the beginning of automatic restart-up is carried out in the compression stroke. This situation arises when the cylinder that is in an intake stroke at the beginning of cranking for automatic restart-up is the second cylinder #2 or the third cylinder #3. Besides, in the case where no missing tooth signal is, recognized to have been output from the crank position sensor 34 in the compression stroke following the intake stroke in which initial fuel injection is carried out in these cylinders, a cam signal is recognized to have been output from the cam position sensor 33 by the time a subsequent missing tooth signal is recognized to have been output. This is because the interval at which a cam signal is output from the cam position sensor 33 is shorter than the interval at which a missing tooth signal is output from the crank position sensor 34. Initial ignition after the beginning of automatic restart-up is carried out in the compression stroke on the condition that it be determined that an appropriate value of the crank angle corresponding to the cam signal matches the detected crank angle when the cam signal is output. Besides, if the cylinder that is in an intake stroke at the beginning of cranking for automatic restart-up is the first cylinder #1 or the fourth cylinder #4, a cam signal is recognized to have been output from the cam position sensor 33 by the time a missing tooth signal is recognized to have been output from the crank position sensor 34. This is because the interval at which a cam signal is output from the cam position sensor 33 is shorter than the interval at which a missing tooth signal is output from the crank position sensor 34. Then, initial ignition after the beginning of automatic restart-up is carried out in a compression stroke following the intake stroke on the condition that it be determined that an appropriate value of the crank angle corresponding to the cam signal matches the detected crank angle when the cam signal is output.

As is apparent from the foregoing, in the case where the amount Z of deviation is smaller than the reference value during automatic stop of the internal combustion engine 1, even before a missing tooth signal is recognized to have been output from the crank position sensor 34 after the beginning of cranking for automatic restart-up, ignition can be begun. That is, if a cam signal is output from the cam position sensor 33 even before the missing tooth signal is recognized to have been output, initial ignition after the beginning of automatic restart-up is carried out on the Condition that it be determined that an appropriate value of the crank angle corresponding to the cam signal matches the detected crank angle. Accordingly, if the amount Z of deviation is smaller than the reference value during automatic stop of the internal combustion engine 1 and the detected crank angle is unlikely to be deviant from the appropriate value, the combustion of fuel can be carried out at a stage as early as possible after the beginning of automatic restart-up.

Figure 7:
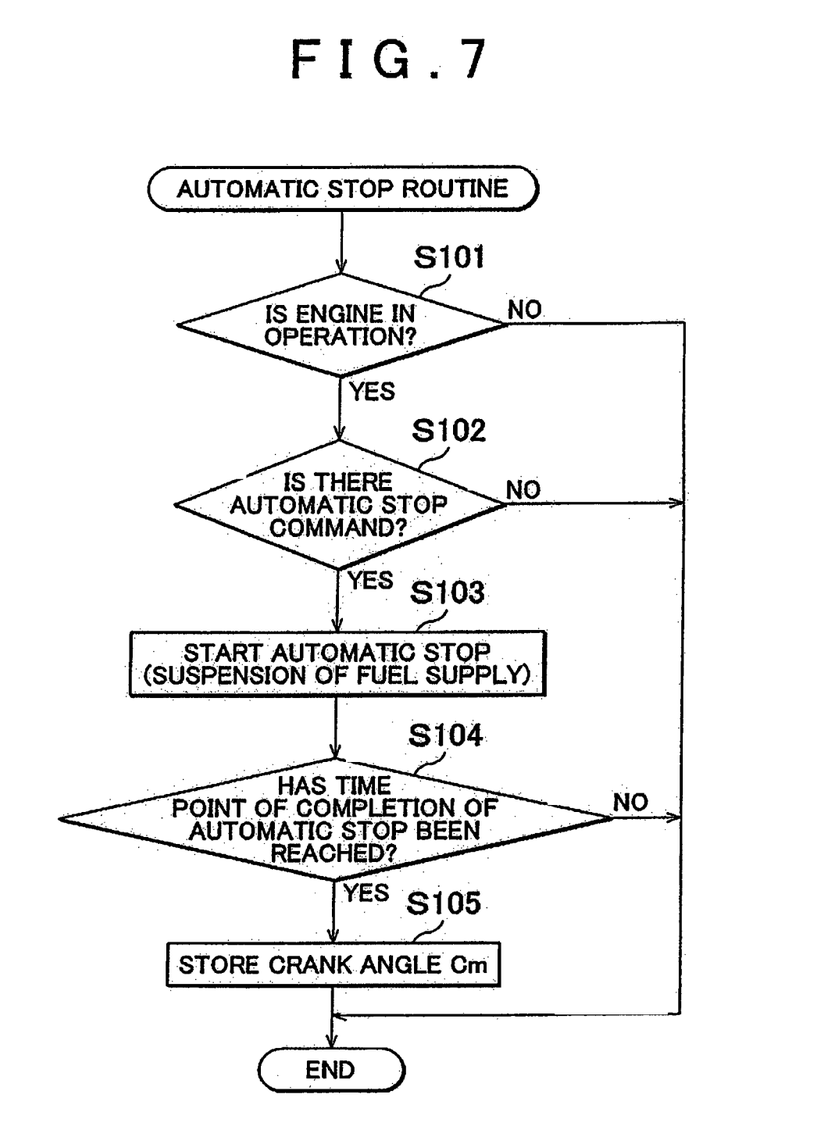
FIG. 7 is a flowchart showing a procedure of carrying out automatic stop in the internal combustion engine.

Next, a procedure of storing the crank angle Cm upon the completion of automatic stop of the internal combustion engine 1 will be described with reference to FIG. 7. FIG. 7 is a flowchart showing an automatic stop routine for automatically stopping the engine 1. This automatic stop routine is periodically executed as, for example, interrupt handling at intervals of a predetermined time through the electronic control unit 21.

In the routine, first of all, it is determined, on the basis of the presence or absence of fuel injection from the fuel injection valve 4 or the like, whether or not the internal combustion engine 1 is in autonomous operation (S101). If a positive determination is made herein, it is determined whether or not there is an automatic stop command that is issued upon the fulfillment of an automatic stop condition (S102). If it is determined that there, is an automatic stop command, fuel injection from the fuel injection valve 4 in the internal combustion engine 1 is stopped, and automatic stop of the engine 1 is begun (S103). Subsequently, it is determined whether or not a time point at which automatic stop of the internal combustion engine 1 is completed has been reached, on the basis of, for example, whether or not a time point at which the engine rotational speed is equal to "0" has been reached (S104). More specifically, if a time point at which the engine rotational speed is equal to "0" has been reached, it is determined that automatic stop of the internal combustion engine 1 is completed. Then, if it is determined that automatic stop of the internal combustion engine 1 is completed, the crank angle detected at that time is stored into the RAM of the electronic control unit 21 as the crank angle Cm at the time point of the completion of automatic stop (S105).

Figure 8:
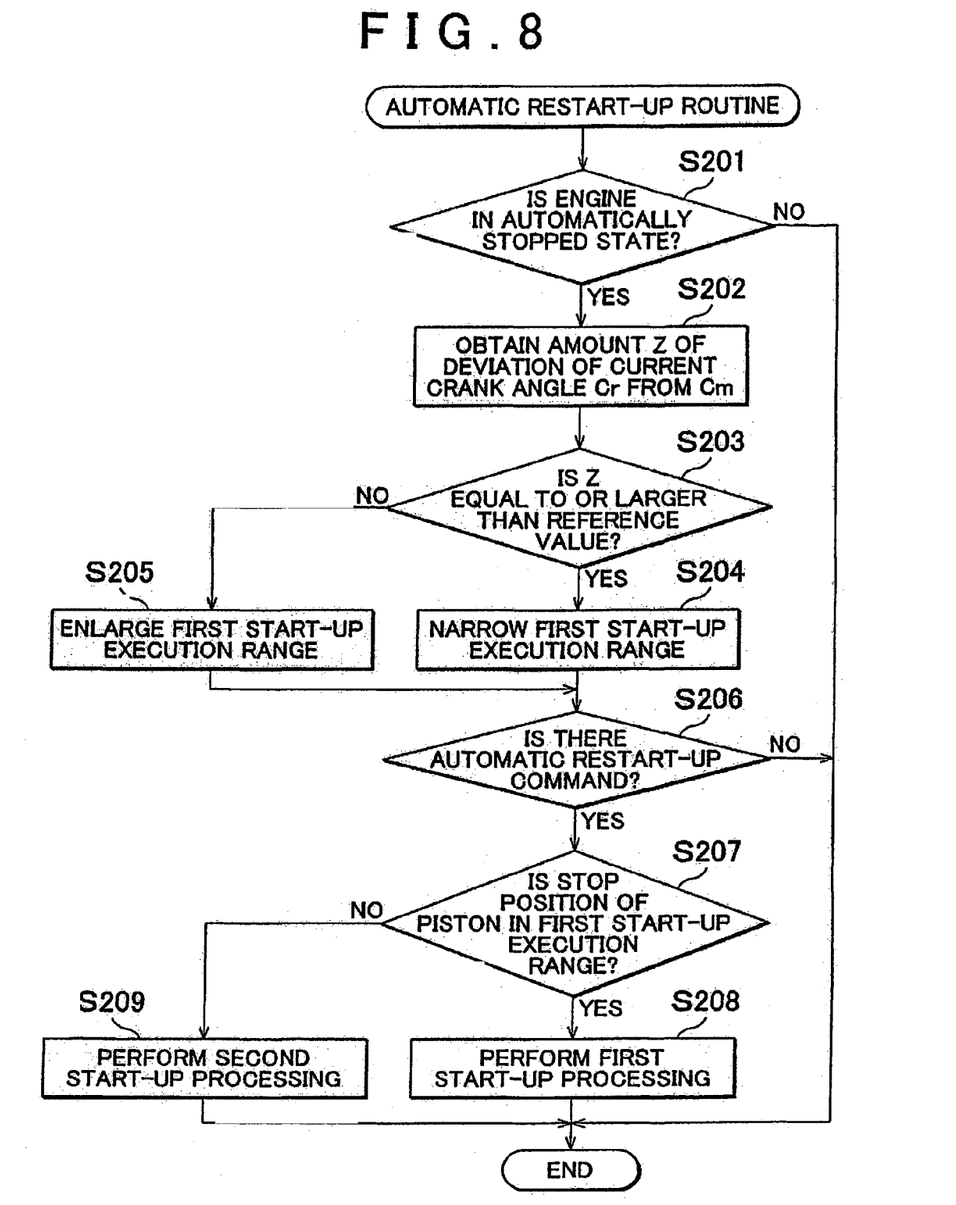
FIG. 8 is a flowchart showing a procedure of carrying out automatic restart-up in the internal combustion engine.

Next, a procedure of variably setting the first start-up execution range and the second start-up execution range, and a procedure of performing the first start-up processing and the second start-up processing during automatic restart-up of the internal combustion engine 1 will be described with reference to FIG. 8. FIG. 8 is a flowchart showing an automatic restart-up routine for automatically restarting up the internal combustion engine 1. This automatic restart-up routine is periodically executed as, for example, interrupt handling at intervals of a predetermined time through the electronic control unit 21.

In the routine, first of all, it is determined, on the basis of the presence or absence of fuel injection from the fuel injection valve 4, an engine rotational speed and the like, whether or not the internal combustion engine 1 is in an automatically stopped state (S201). If a positive determination is made in S202, the amount Z of deviation of the current crank angle Cr detected on the basis of a signal from the crank position sensor 34 from the crank angle Cm at the time point of the completion of automatic stop of the internal combustion engine 1 is obtained (S202). If this amount Z of deviation is equal to or larger than a predetermined reference value, the threshold for defining the first start-up execution range and the second start-up execution range is set to the value Sa, whereby the first startup execution range is narrowed and the second start-up execution range is enlarged (S204). Besides, if the amount of deviation is smaller than the reference value, the threshold is set to the value Sb that is on the retard side of the value Sa, whereby the first start-up execution range is enlarged and, the second start-up execution range is narrowed (S205).

Under a situation where the first start-up execution range and the second start-up execution range are variably set when the internal combustion engine 1 is in an automatically stopped state as described above, it is determined whether or not there is an automatic restart-up command that is issued upon the fulfillment of an automatic restart-up condition of the internal combustion engine 1 (S206). Then, if it is determined that there is an automatic restart-up command, it is determined whether or not the stop position of the piston 6 in the cylinder that is in an intake stroke among the cylinders of the internal combustion engine 1 in an automatically stopped state is in the first start-up execution range (S207). If a positive determination is made in S207, the first start-up processing is performed in automatically restarting up the internal combustion engine 1 (S208). If a negative determination is made in S207, the second start-up processing is performed in automatically restarting up the internal combustion engine 1 (S209).

According to this embodiment of the invention described above in detail, the effects shown below are obtained. (1) In automatically restarting up the internal combustion engine 1 in an automatically stopped state, the aforementioned processings [1] to [3] are performed. Thus, while the initial combustion process of fuel can be made favorable by carrying out initial ignition after the beginning of automatic restart-up at an appropriate timing, the completion of automatic restart-up at an early stage can be realized by carrying out the combustion of fuel at a stage as early as possible after the beginning of automatic restart-up.

(2) In the second start-up processing that is performed in the aforementioned processing [2], initial fuel injection is carried out in the second cylinder that next enters an intake stroke among the cylinders of the internal combustion engine after the beginning of automatic restart-up, and initial ignition is carried out in an immediately subsequent compression stroke in the cylinder. In this case, in the first cylinder that enters an intake stroke among the cylinders of the internal combustion engine 1 after the beginning of automatic restart-up, it may be impossible to carry out initial ignition at an appropriate timing in a compression stroke immediately following the intake stroke among the cylinders of the internal combustion engine 1. Accordingly, in the first cylinder that enters an intake stroke among the cylinders of the internal combustion engine 1 after the beginning of automatic restart-up, fuel injection is not carried out. Accordingly, the fuel injection can be restrained from being carried out in vain through the performance of the second start-up processing.

(3) If the amount Z of deviation is equal to or larger than the reference value during automatic stop of the internal combustion engine 1, the threshold that defines the first start-up execution range and the second start-up execution range is set to the value Sa on the advance side. This threshold (Sa) is set to such a value that the stop position of the piston 6 in the cylinder that is in an intake stroke among the cylinders of the internal combustion engine 1 during automatic stop of the internal combustion engine 1 allows a missing tooth signal to be recognized to have been output from the crank position sensor 34 at a stage as early as possible after the beginning of cranking for automatic restart-up in the first start-up execution range. Furthermore, in the case where the amount Z of deviation is equal to or larger than the reference value during automatic stop of the internal combustion engine 1, even if the first start-up processing or the second start-up processing is performed, ignition is begun after a missing tooth signal is recognized to have been output from the crank position sensor 34 after the beginning of cranking for automatic restart-up. In other words, after the deviation of the detected crank angle from the appropriate value is corrected on the basis of the outputting of the missing tooth signal, initial ignition after the beginning of automatic restart-up is carried out. In this case, if the first start-up processing is performed during automatic restart-up under a situation where the amount Z of deviation is equal to or larger than the reference value and the detected crank angle is likely to be deviant from the appropriate value, initial ignition after the beginning of automatic restart-up can be carried out at an early stage and at an appropriate timing, and the initial combustion process of fuel after the beginning of automatic restart-up can be made favorable through this ignition. Besides, in the case where the second start-up processing is performed during the automatic restart-up instead of the first start-up processing as well, initial ignition after the beginning of automatic restart-up is carried out after a missing tooth signal is recognized to have been output from the crank position sensor 34, so that the ignition can be carried out at an appropriate timing. The initial combustion process of fuel after the beginning of automatic restart-up can be made favorable through this ignition.

(4) If the amount Z of deviation is smaller than the reference value during automatic stop of the internal combustion engine 1, the threshold that defines the first start-up execution range and the second start-up execution range is set to the value Sb that is on the retard side of the value Sa. Furthermore, even if the first start-up processing or the second start-up processing is performed at this time, ignition is begun after a missing tooth signal is recognized to have been output from the crank position sensor 34 after the beginning of cranking for automatic restart-up. In other words, initial ignition after the beginning of automatic restart-up is carried out after the deviation of the detected crank angle from the appropriate value is corrected on the basis of the outputting of the missing tooth signal. Besides, when a cam signal is output from the crank position sensor 33 even before the missing tooth signal is recognized to have been output, in other words, even before the deviation of the detected crank angle from the appropriate value is corrected, initial ignition after the beginning of automatic restart-up is carried out on the condition that it be determined that the appropriate value of the crank angle corresponding to the cam signal matches the detected crank angle. Accordingly, if the amount Z of deviation is smaller than the reference value during automatic stop of the internal combustion engine 1 and the detected crank angle is unlikely to be deviant from the appropriate value, the combustion of fuel can be carried out at a stage as early as possible after the beginning of automatic restart-up.

(5) As the threshold (Sb) at the time when the amount Z of deviation is smaller than the reference value during automatic stop of the internal combustion engine 1 is retarded, the possibility of the stop position of the piston 6 in the cylinder that, is in an intake stroke among the cylinders of the internal combustion, engine 1 at the beginning of the performance of the first start-up processing being a position close to the bottom dead center increases. Then, as the stop position of the piston 6 approaches the bottom dead center, the amount of fuel that is sucked into the cylinder as the piston 6 moves after the beginning of cranking for automatic restart-up decreases, and hence the likelihood of the occurrence of misfire increases when fuel is burned in the cylinder. Besides, as the stop position of the piston 6 approaches the bottom dead center, the amount of high-temperature air that remains in the cylinder at the beginning of cranking for automatic restart-up increases, and hence the likelihood of the occurrence of self-ignition of fuel increases when the fuel is burned in the cylinder. In this view, the threshold (Sb) is set to such a value that neither misfire nor self-ignition of fuel is caused during the initial combustion of fuel through the first start-up processing. Accordingly, when the first start-up processing is performed under a situation where the amount Z of deviation is smaller than the reference value, misfire or self-ignition of fuel can be restrained from being caused during the initial combustion of fuel through the first start-up processing.

The foregoing embodiment of the invention can also be modified, for example, as follows. The values Sa and Sb can be appropriately changed from the values exemplified in the foregoing embodiment of the invention.

During automatic restart-up from a state where the amount Z of deviation is smaller than the reference value, initial ignition after automatic restart-up may be carried out only after a missing tooth signal is recognized to have been output from the crank position sensor 34.

In a process of automatically stopping the internal combustion engine 1, the control of the opening degree of the throttle valve 13 may be performed to adjust the stop position of the piston 6 at the time point of the completion of automatic stop to a desired position.

While the disclosure has been explained in conjunction with the specific exemplary embodiment thereof, it is evident that many alternatives, modifications, and variations will be apparent to those skilled in the art. Accordingly, the exemplary embodiment of the disclosure as set forth herein is intended to be illustrative, nonlimiting. There are changes that may be made without departing from the scope of the disclosure.

The invention claimed is:

1. A control apparatus for an internal combustion engine that is configured to perform automatic stop and automatic restart-up, the control apparatus comprising:
    a crank position sensor that outputs a crank signal in response to passage of a plurality of protrusions formed on a crank rotor when the crank rotor that is fixed to a crankshaft of the internal combustion engine rotates with the crankshaft,
    a crank angle detection device that detects a crank angle of the internal combustion engine based on the crank signal from the crank position sensor and that corrects a deviation of the detected crank angle from a value when a missing tooth signal corresponding to a missing tooth formed on the crank rotor is output from the crank position sensor; and
    a controller configured to perform fuel injection and ignition in each of cylinders in the internal combustion engine on a basis of the crank angle, wherein
    the controller is configured to perform a first start-up processing when a stop position of a piston resulting from the automatic stop is in a first start-up execution range that is part of a range, in which the piston stops in the cylinder that is in an intake stroke among the cylinders of the internal combustion engine, and that is on an advance side of a threshold in terms of crank angle, wherein, in the first start-up processing, fuel injection is performed at beginning of the automatic restart-up in the cylinder that is in the intake stroke and ignition is performed in a subsequent initial compression stroke in the same cylinder;
    the controller is configured to perform a second start-up processing when the stop position of the piston resulting from the automatic stop is in a second start-up execution range that is part of a range, in which the piston stops in the cylinder that is in the intake stroke among the cylinders of the internal combustion engine, and that is on a retard side of the threshold in terms of crank angle, wherein, in the second start-up processing, initial fuel injection is performed in the cylinder that next enters an intake stroke among the cylinders of the internal combustion engine after beginning of automatic restart-up and initial ignition is performed in a subsequent compression stroke in the same cylinder;
    the controller is configured to narrow the first start-up execution range by shifting the threshold on the advance side when an amount of deviation of the detected crank angle from a value at a time point of completion of the automatic stop is equal to or larger than a reference value during the automatic stop of the internal combustion engine, the amount of deviation being obtained between the completion of automatic stop of the internal combustion engine and the beginning of automatic restart-up; and
    the controller is configured to enlarge the first start-up execution range by shifting the threshold on the retard side when the amount of deviation is smaller than the reference value during the automatic stop of the internal combustion engine, the controller is configured to set the threshold at a time when the amount of deviation is equal to or larger than the reference value to such a value that the missing tooth signal from the crank position sensor can be recognized to have been output, after beginning of cranking for automatic restart-up under a situation where the stop position of the piston resulting from automatic stop is in the first start-up execution range, and
    the controller is configured to perform ignition after the missing tooth signal is recognized to have been output from the crank position sensor after beginning of cranking for automatic restart-up, when the amount of deviation is equal to or larger than the reference value.

2. The control apparatus for the internal combustion engine according to claim 1, further comprising:
    a cam position sensor that outputs a cam signal corresponding to passage of the plurality of the protrusions formed on a cam rotor at a shorter interval than the missing tooth signal, when the cam rotor that is fixed to a camshaft of the internal combustion engine rotates integrally with the camshaft, wherein:
    the controller is configured to set the threshold on the retard side of a threshold set at a time when the amount of deviation is equal to or larger than the reference value, when the amount of deviation is smaller than the reference value, and
    the controller is configured to perform ignition after the missing tooth signal is recognized to have been output from the crank position sensor, after beginning of cranking for automatic restart-up, when the amount of deviation is smaller than the reference value, and the controller is configured to perform ignition on a condition that it be determined that the value of the crank angle corresponding to the cam signal matches the detected crank angle, when the cam signal is output from the cam position sensor before the missing tooth signal is recognized to have been output.

3. The control apparatus for the internal combustion engine according to claim 1, wherein
the controller is configured to set the threshold at a time when the amount of deviation is smaller than the reference value to such a value that misfire is not caused during initial combustion of fuel through the first start-up processing.

4. The control apparatus for the internal combustion engine according to claim 1, wherein
the controller is configured to set the threshold at a time when the amount of deviation is smaller than the reference value to such a value that self-ignition of fuel is not caused during initial combustion of the fuel through the first start-up processing.

* * * * *